United States Patent
Wan et al.

(10) Patent No.: US 8,836,307 B2
(45) Date of Patent: Sep. 16, 2014

(54) VOLTAGE REGULATOR AND PULSE WIDTH MODULATION SIGNAL GENERATION METHOD THEREOF

(75) Inventors: Yi-Cheng Wan, Taoyuan County (TW); Jian-Rong Huang, Hsinchu (TW); Chien-Hui Wang, Hsinchu (TW); Cheng-Feng Chung, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 429 days.

(21) Appl. No.: 13/038,660

(22) Filed: Mar. 2, 2011

(65) Prior Publication Data

US 2012/0146608 A1    Jun. 14, 2012

(30) Foreign Application Priority Data

Dec. 8, 2010 (TW) ................................ 99142864 A

(51) Int. Cl.
*G05F 1/00* (2006.01)
*H02M 3/156* (2006.01)

(52) U.S. Cl.
CPC .................................... *H02M 3/156* (2013.01)
USPC ........................................ 323/284; 323/288

(58) Field of Classification Search
USPC ................................................. 323/282–285
See application file for complete search history.

(56) References Cited

U.S. PATENT DOCUMENTS

| | | | | |
|---|---|---|---|---|
| 5,414,342 | A * | 5/1995 | Mammano et al. | 323/288 |
| 6,400,232 | B1 * | 6/2002 | Good et al. | 331/143 |
| 6,518,738 | B1 * | 2/2003 | Wang | 323/284 |
| 6,583,610 | B2 * | 6/2003 | Groom et al. | 323/288 |
| 7,436,158 | B2 | 10/2008 | Huang et al. | |
| 7,714,547 | B2 | 5/2010 | Fogg et al. | |
| 8,618,779 | B2 * | 12/2013 | Garrett et al. | 323/271 |
| 2004/0257056 | A1 * | 12/2004 | Huang et al. | 323/282 |
| 2007/0013356 | A1 * | 1/2007 | Qiu et al. | 323/288 |
| 2008/0129264 | A1 | 6/2008 | Moussaoui et al. | |
| 2009/0072807 | A1 * | 3/2009 | Qiu et al. | 323/285 |

FOREIGN PATENT DOCUMENTS

| | | |
|---|---|---|
| CN | 1822479 A | 8/2006 |
| CN | 101741248 | 6/2010 |
| TW | 523225 | 3/2003 |
| TW | 200843309 | 11/2008 |
| TW | 200843310 | 11/2008 |
| TW | 201025812 | 7/2010 |

* cited by examiner

*Primary Examiner* — Adolf Berhane
*Assistant Examiner* — Henry Lee, III
(74) *Attorney, Agent, or Firm* — WPAT, PC; Justin King

(57) ABSTRACT

In a PWM signal generation method of a voltage regulator, an output sense signal, a first ramp signal and a second ramp signal are provided. A first time point of the first ramp signal crossing with the output sense signal is used to determine a start point of an ON-time of a PWM signal, and a second time point of the second ramp signal crossing with the output sense signal is used to determine an end point of the ON-time of the PWM signal. Moreover, the first ramp signal is reset to a reference voltage at the first time point and then maintained at the reference voltage, and further ramps down starting from the end point of the ON-time. The second ramp signal ramps up starting from the start point of the ON-time, and then is reset to a preset voltage at the second time point.

20 Claims, 5 Drawing Sheets

VOLTAGE REGULATOR AND PULSE WIDTH MODULATION SIGNAL GENERATION METHOD THEREOF

FIELD OF THE INVENTION

The present invention relates to power regulators or converters, and more particularly to a voltage regulator and a pulse width modulation signal generation method of a voltage regulator.

BACKGROUND OF THE INVENTION

The load current of a modern central processing unit (CPU) is highly dynamic and changes very quickly from low to high and from high to low. A CPU current transient may occur within 1 microsecond, for example, which is less than the typical switching period of conventional voltage regulators. It is desired to provide a DC-to-DC voltage regulator with a control loop (e.g., voltage mode or current mode control loop) that can provide a nearly real time transient response to the load change to regulate the correct output voltage.

In a conventional constant frequency pulse width modulation (PWM) scheme, a single ramp signal or dual ramp signals are often induced by a constant frequency synchronous clock to be generated as a reference signal and then compared with an output voltage error signal to generate a pulse width modulation signal for regulating the output voltage. Herein, the output voltage error signal is varied along the change of a difference between an output voltage and a target voltage. As illustrated in FIG. 1, a timing diagram associated with a scheme in the prior art is shown. The scheme is that a single ramp signal RAMP is induced by a constant frequency synchronous clock CLK to be generated as a reference signal and then compared with an output voltage error signal COMP to generate a pulse width modulation signal PWM. In particular, a single pulse of the synchronous clock CLK functions as a trigger signal for triggering the switching between ramp up and ramp down of the single ramp signal RAMP. Adjacent two time points of the ramp signal RAMP crossing with the output voltage error signal COMP respectively are used to determine a start point (i.e., generally a switching trigger point of the pulse width modulation signal PWM) and an end point of an ON-time of the pulse width modulation signal PWM.

However, it can be found from FIG. 1 that, since the ramp signal RAMP is constrained by the synchronous clock CLK to be fixed, in the conventional constant frequency PWM scheme, the ON-time of the pulse width modulation signal PWM is difficult to provide a real time response to the transient (e.g., the surge of the COMP in FIG. 1) of the output voltage error signal COMP caused by the load change/transient.

In another aspect, a constant ON-time pulse width modulation scheme (i.e., generally related to COT system) has been disclosed by such as U.S. Pat. No. 7,714,547 (the disclosure of which is fully incorporated by reference herein), and is often used for low duty cycle "Buck" converters because it provide fast transient response and does not require compensation for control loop stabilization. In the constant ON-time control scheme, when the regulated output voltage falls below a reference threshold, a constant ON-time DC-to-DC converter/regulator delivers energy to its output load whereby the amount of energy delivered by the converter is determined by the ON-time pulse of the converter. However, since the ON-time is constant, the constant ON-time control scheme could not self-correlate a suitable ON-time to meet the energy requirements of different load conditions after any load transient, encountering the load transient regulation issue.

SUMMARY OF THE INVENTION

Therefore, the present invention is directed to a voltage regulator, which can provide a fast transient response to the change of load.

The present invention is further directed to a pulse width modulation signal generation method, which facilitates the ON-time of pulse width modulation signal to be fast responsive to the change of load.

In one aspect, a voltage regulator in accordance with an embodiment of the present invention includes a first comparator, a flip-flop and a second comparator. The first comparator is for comparing a first ramp signal with an output sense signal to generate an ON-time trigger signal for a pulse width modulation signal. The output sense signal includes an output voltage error signal, or includes a current sense signal and the output voltage error signal mixed in a preset ratio instead. The current sense signal is varied along an inductor current of the voltage regulator. The output voltage error signal is varied along a difference between an output voltage of the voltage regulator and a first reference voltage. The flip-flop is for outputting the pulse width modulation signal and subjected to the control of the ON-time trigger signal for the pulse width modulation signal to determine a start point of an ON-time of the pulse width modulation signal. The second comparator is for comparing with a second ramp signal with the output sense signal to determine whether to reset an output of the flip-flop so as to determine an end point of the ON-time of the pulse width modulation signal. Moreover, the first ramp signal is reset to a second reference voltage at the start point of the ON-time of the pulse width modulation signal and then is kept on the second reference voltage, and further ramps down starting from the end point of the ON-time of the pulse width modulation signal. The second ramp signal ramps up starting from the start point of the ON-time of the pulse width modulation signal. and then is reset at the end point of the ON-time of the pulse width modulation signal.

In another aspect, a voltage regulator in accordance with another embodiment of the present invention includes a first comparator, a plurality of flip-flops and a plurality of second comparators. The first comparator is for comparing a first ramp signal with an output sense signal to generate a plurality of ON-time trigger signals in a preset order respectively for a plurality of pulse width modulation signals. The output sense signal includes a plurality of current sense signals and an output voltage error signal mixed together in a preset ratio. Each of the current sense signals is varied along an inductor current of the voltage regulator. The output voltage error signal is varied along a difference between an output voltage of the voltage regulator and a first reference voltage. The flip-flops are for outputting the pulse width modulation signals respectively. The flip-flops receive the ON-time trigger signals for the pulse width modulation signals and each is for determining a start point of an ON-time of a corresponding one of the pulse width modulation signals according to the received ON-time trigger signals cooperative with an input signal inputted to a data input terminal of the flip-flop. Each of the second comparators is for comparing a second ramp signal with the output sense signal to determine whether to reset an output of a corresponding one of the flip-flops so as to determine an end point of the ON-time of the pulse width modulation signal outputted from the corresponding flip-flop. Furthermore, the first ramp signal is reset to a second reference voltage at the start point of the ON-time of each of the pulse width modulation signals and maintained at the second reference voltage, and further ramps down starting from the end point of the ON-time of the pulse width modulation signal. Each of the second ramp signals ramps up starting from the start point of the ON-time of the corresponding pulse width modulation signal, and then is reset at the end point of the ON-time of the corresponding pulse width modulation signal.

In still another aspect, a pulse width modulation signal generation method in accordance with a still another embodiment of the present invention is adapted for a voltage regulator. In particular, in the pulse width modulation signal generation method, an output sense signal is provided. The output sense signal includes an output voltage error signal, or includes one or multiple current sense signals and the output voltage error signal mixed together in a preset ratio instead. Each the current sense signal is varied along an inductor current of the voltage regulator, and the output voltage error signal is varied along a difference between an output voltage of the voltage regulator and a first reference voltage. Furthermore, a first ramp signal is provided. A first time point of the first ramp signal crossing with the output sense signal is used to determine a start point of an ON-time of a pulse width modulation signal. In addition, a second ramp signal is provided. A second time point of the second ramp signal crossing with the output sense signal is used to determine an end point of the ON-time of the pulse width modulation signal. The first ramp signal is reset to a second reference voltage at the first time point and then kept on the second reference voltage, and further ramps down starting from the end point of the ON-time of the pulse width modulation signal. The second ramp signal ramps up starting from the start point of the ON-time of the pulse width modulation signal, and then is reset to a preset voltage at the second time point.

Moreover, in the pulse width modulation signal generation method, when the amount of current sense signal is multiple, a third ramp signal is further provided. A third time point of the first ramp signal crossing with the output sense signal is used to determine a start point of an ON-time of a second pulse width modulation signal, and a fourth time point of the third ramp signal crossing with the output sense signal is used to determine an end point of the ON-time of the second pulse width modulation signal. The third time point and the fourth time point fall in a switching period of the first pulse width modulation signal including both the first time point and the second time point.

In summary, in the various embodiments of the present invention, the output sense signal and the first ramp signal together are used to generate the switching trigger point (i.e., the start point of the ON-time) of the pulse width modulation signal, and further the output sense signal and the second ramp signal (or the third ramp signal) together are used to determine the end point of the ON-time and the trigger point for triggering the first ramp signal to ramp down, so that the ON-time is dynamic. The first ramp signal is no longer constrained by the constant frequency synchronous clock like in the prior art, and therefore the ON-time of the pulse width modulation signal can provide a fast transient response to the change of the output sense signal caused by the load change. Moreover, owing to the present invention can provide dynamic ON-time control, which can solve the load transient regulation issue of the conventional COT system and further still can keep the advantages of COT system in steady state operation such as line regulation and compensation issue. Accordingly, the performance of the voltage regulator is effectively improved consequently.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
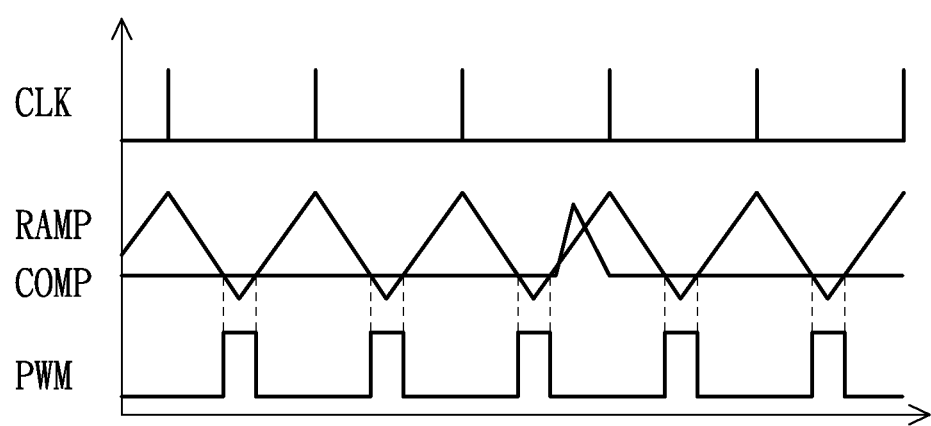
FIG. 1 is a timing diagram associated with a conventional scheme of using a constant frequency synchronous clock to induce a single ramp signal to be generated for providing a pulse width modulation signal.
Figure 2:
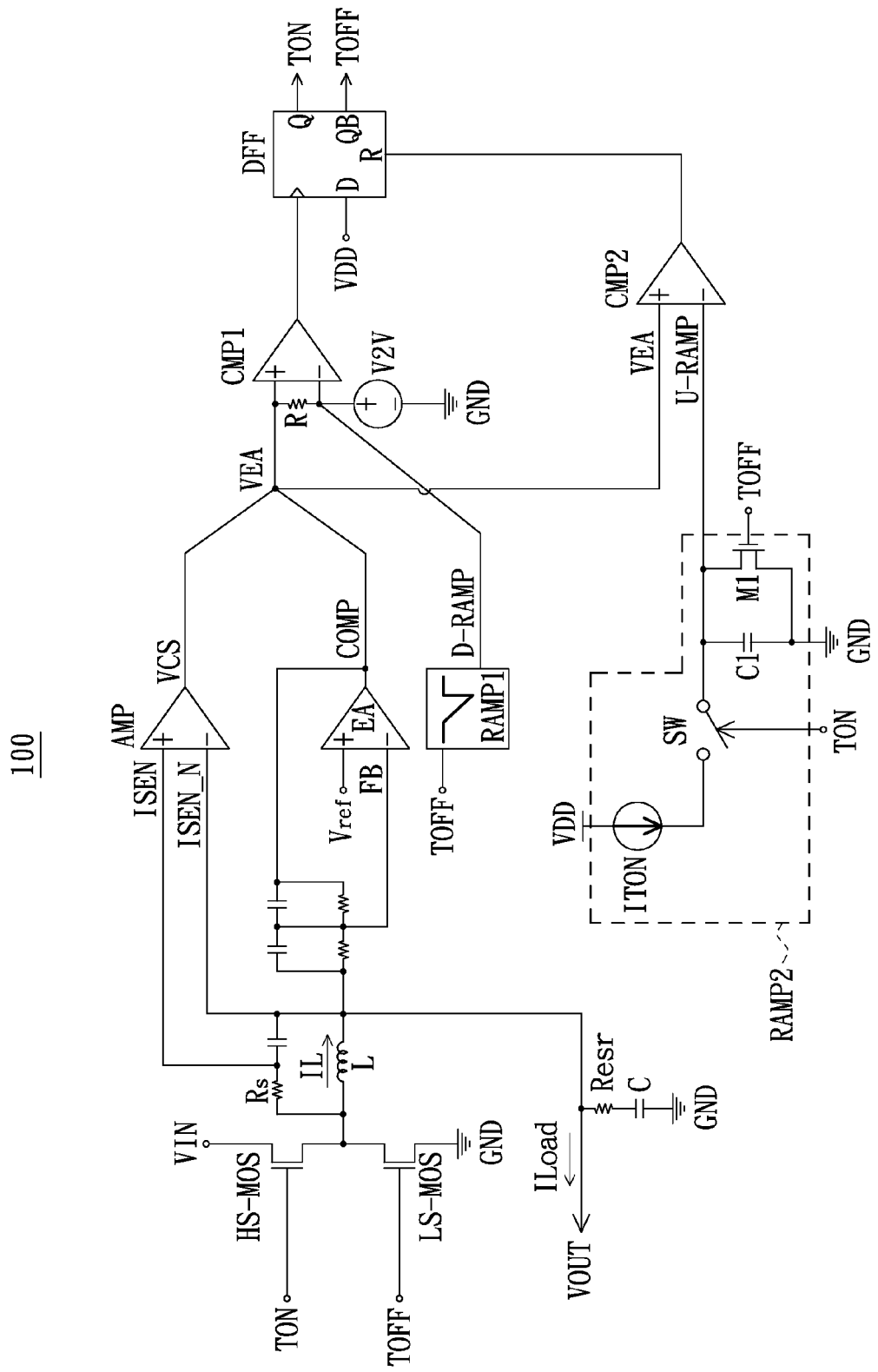
FIG. 2 is a schematic circuit structure of a voltage regulator in accordance with a first embodiment of the present invention.

Referring to FIG. 2, a schematic circuit structure of a voltage regulator in accordance with a first embodiment of the present invention is shown. As illustrated in FIG. 2, the voltage regulator 100 receives an input voltage VIN and controls switch transistors HS-MOS, LS-MOS respectively according to pulse width modulation signals TON, TOFF to produce an inductor current IL for charging an output capacitor C with an equivalent series resistance Resr to thereby obtain an output voltage VOUT for a load. In the illustrated embodiment, the voltage regulator 100 primarily includes comparators CMP1, CMP2, D-type flip-flop DFF and ramp signal generation circuits RAMP1, RAMP2.

More specifically, the comparator CMP1 has a positive input terminal (+) and a negative input terminal (−). The positive input terminal (+) of the comparator CMP1 receives an output sense signal VEA and is electrically coupled to the negative input terminal (−) of the comparator CMP1 through a resistor R. The negative input terminal (−) of the comparator CMP1 receives a ramp signal D-RAMP provided from the ramp signal generation circuit RAMP1 and is electrically coupled to a reference voltage V2V. Herein, the reference voltage V2V acts as an initial voltage level of the ramp signal D-RAMP. The comparator CMP1 compares the ramp signal D-RAMP with the output sense signal VEA to output an ON-time trigger signal for the pulse width modulation signal TON to set a start point of an ON-time of the pulse width modulation signal TON. In the illustrated embodiment, the output sense signal VEA includes a current sense signal VCS and an output voltage error signal COMP mixed together in a preset ratio. The current sense signal VCS is generated by a voltage amplifier AMP according to voltage signals ISEN, ISEN_N respectively on two terminals of a current sense resistor Rs, and thus the current sense signal VCS is varied along the inductor current IL flowing through an inductor L of the voltage regulator 100, such as the absolute value of the current sense signal VCS is proportional to that of the inductor current IL. The output voltage error signal COMP is generated by an error amplifier EA according to a difference between a feedback value FB of the output voltage VOUT and a reference voltage Vref (e.g., a target voltage identification value), and thus the output voltage error signal COMP is varied along the difference between the feedback value FB and the reference voltage Vref. Moreover, the current sense signal VCS and the output voltage error signal COMP are, for example mixed with in a ratio of 10:1, such exemplary ratio can be preset by setting amplification factors of the voltage amplifier AMP and the error amplifier EA, but it is not to limit the present invention.

The D-type flip-flop has a clock input terminal electrically coupled to an output terminal of the comparator CMP1. The clock input terminal receives the ON-time trigger signal for the pulse width modulation signal TON outputted from the comparator CMP1, and thereby the D-type flip-flop DFF is subjected to the control of the ON-time trigger signal to output the pulse width modulation signal TON at an output terminal Q and further output the pulse width modulation signal TOFF at another output terminal QB. A data input terminal D of the D-type flip-flop DFF is electrically coupled to a high logic voltage VDD. Herein, the pulse width modulation signal TOFF is phase-inverted with respect to the pulse width modulation signal TON, and further the pulse width modulation signal TOFF acts as a trigger signal for triggering the ramp signal D-RAMP provided from the ramp signal generation circuit RAMP1 to ramp down.

The comparator CMP2 has a positive input terminal (+) and a negative input terminal (−). The positive input terminal (+) of the comparator CMP2 receives the output sense signal VEA. The negative input terminal (−) of the comparator CMP2 receives a ramp signal U-RAMP provided from the ramp signal generation circuit RAMP2. An output terminal of the comparator CMP2 is electrically coupled to a reset terminal R of the D-type flip-flop DFF. The comparator CMP2 compares the ramp signal U-RAMP with the output sense signal VEA to determine the moment of resetting the D-type flip-flop DFF, and thereby to determine an end point of the ON-time of the pulse width modulation signal TON and the moment of the ramp signal D-RAMP starting to ramp down. In the illustrated embodiment, the ramp signal generation circuit RAMP2 is subjected to the control of the pulse width modulation signals TON, TOFF outputted from the D-type flip-flop, and primarily includes a power source ITON, a switch SW, a capacitor C1 and a transistor M1. The power source ITON and the switch SW cooperatively constitute a charging circuit. The charging circuit is subjected to the control of the pulse width modulation signal TON to selectively charge the capacitor C1 so as to enable the ramp signal U-RAMP to start to ramp up. The transistor M1 acts as a discharging circuit. The discharging circuit is subjected to the control of the pulse width modulation signal TOFF to selectively quickly discharge the capacitor C1 to a preset voltage level e.g., a grounding level GND so as to reset the ramp signal U-RAMP.

Figure 3:
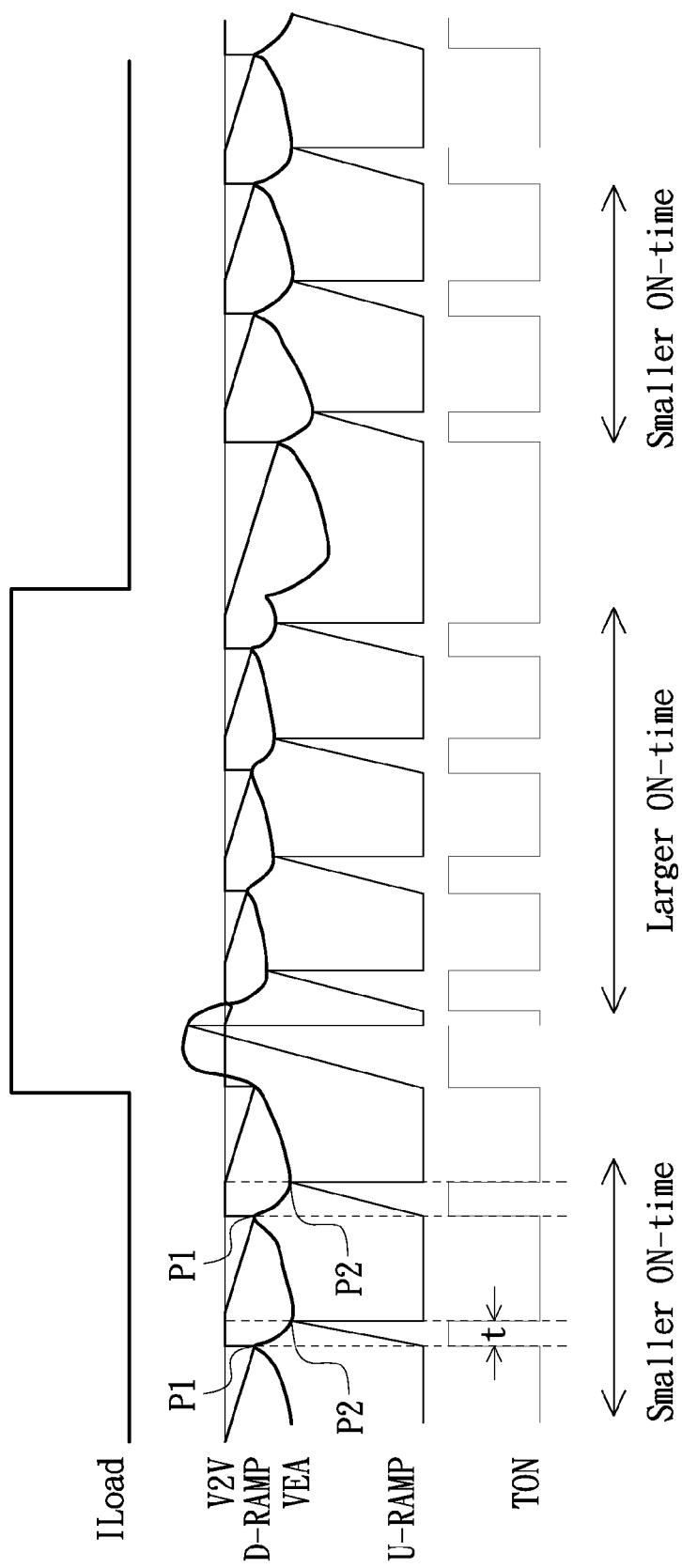
FIG. 3 is a timing diagram of multiple signals of the voltage regulator in FIG. 2.

Referring to FIG. 2 and FIG. 3 together, FIG. 3 shows a timing diagram associated with multiple signals such as a load current ILoad of the voltage regulator, the reference voltage V2V, the ramp signals D-RAMP, U-RAMP, the output sense signal VEA and the pulse width modulation signal TON in FIG. 2. As illustrated in FIG. 3, when the ramp signal D-RAMP is crossed with the output sense signal VEA to define a time point P1 acting as an ON-time trigger point for the pulse width modulation signal TON, the ramp signal D-RAMP is reset to the reference voltage V2V at the time point P1 and then kept on the reference voltage V2V for a while, the output terminal Q of the D-type flip-flop DFF starts to output a high voltage level (i.e., the pulse width modulation signal TON is at a high voltage level), the switch SW in the ramp signal generation circuit RAMP2 is turned on to charge the capacitor C1 to thereby enable the ramp signal U-RAMP to ramp up. After that, when the ramp signal U-RAMP ramps up to be crossed with the output sense signal VEA to define a time point P2, the D-type flip-flop DFF is reset so that the pulse width modulation signal TON outputted from the output terminal Q of the D-type flip-flop DFF jumps to a low voltage level, while the pulse width modulation signal TOFF phase-inverted with the pulse width modulation signal TON jumps to the high voltage level, the transistor M1 in the ramp signal generation circuit RAMP2 is enabled to be turned on by the pulse width modulation signal TOFF, the capacitor C1 is fast discharged to the preset voltage level (e.g., the grounding level GND), so that the ramp signal U-RAMP is reset to the preset voltage level. The ramp signal generation circuit RAMP1 is subjected to the trigger of the pulse width modulation signal TOFF, so that the ramp signal D-RAMP provided from the ramp signal generation circuit RAMP1 starts to ramp down from the reference voltage V2V and then is reset until the ramp signal D-RAMP crossing with the output sense signal VEA again.

It can be found from FIG. 3 that, when the voltage regulator 100 operates in a light load steady operation period, the load current ILoad is relatively small, the ON-time t of the pulse width modulation signal TON is relatively small correspondingly. Whereas, when the voltage regulator 100 operates in a heavy load steady operation period, the load current ILoad is relatively large, the ON-time t of the pulse width modulation signal TON is relative large correspondingly. In short, in the different steady operation periods, the ON-time t of the pulse width modulation signal TON is varied along the change of load condition. In another aspect, in a load transient period (which is corresponding to the load current ILoad being changed from large to small or from small to large), the voltage regulator 100 also can provide a suitable ON-time t according to the change of output (including the change of the inductor current) to regulate the corrected output voltage VOUT in real-time. In summary, the voltage regulator 100 of the present embodiment can provide a totally load situation-originated pulse width modulation control loop which can provide a dynamic ON-time for the pulse width modulation signal and thus will no longer be constrained by the synchronous signal and the switching frequency similar to the prior art.

Figure 4:
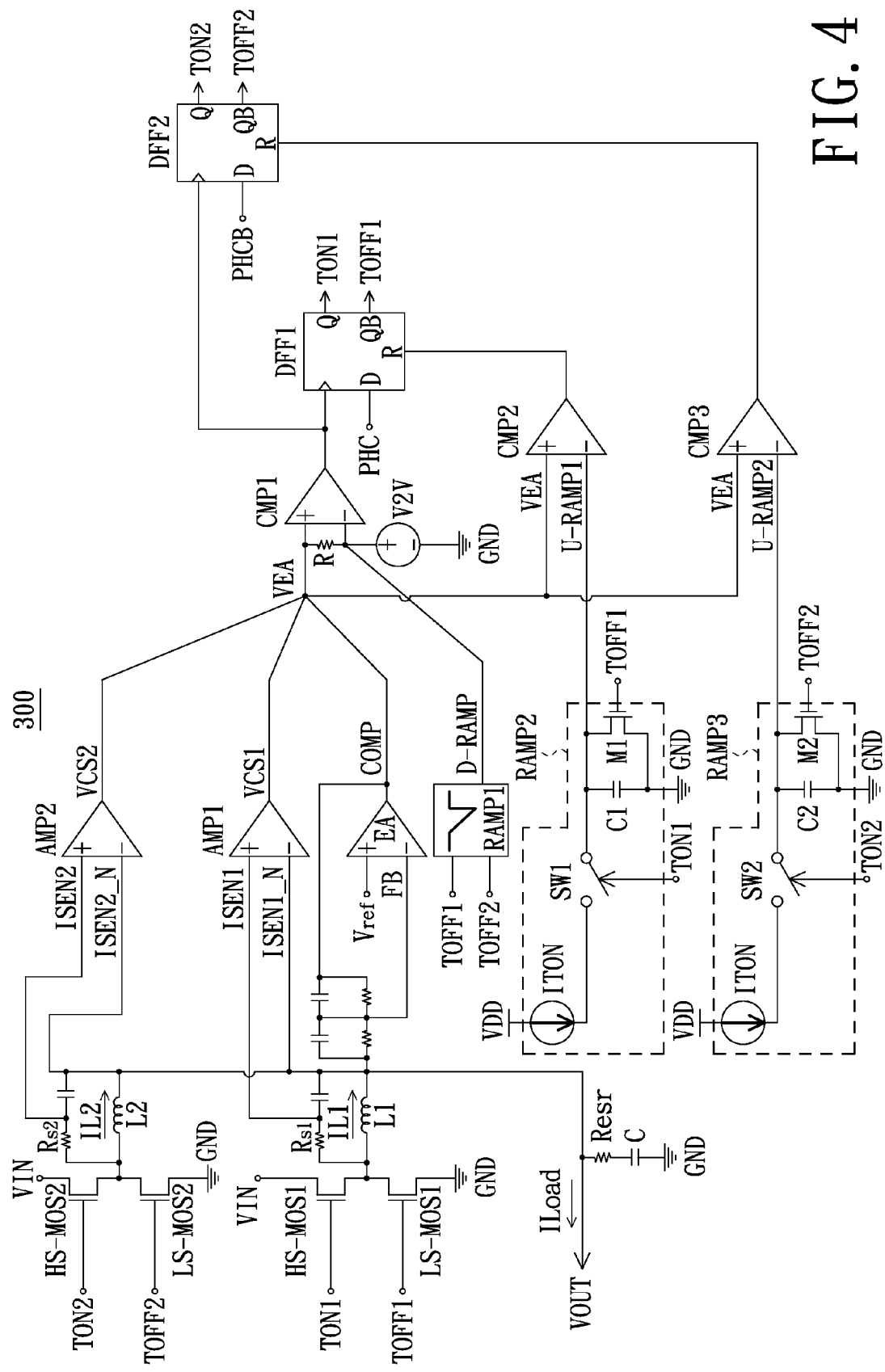
FIG. 4 is a schematic circuit structure of a voltage regulator in accordance with a second embodiment of the present invention.

It is indicated that, the first embodiment of the present invention has described the voltage regulator 100 with a single channel current sense signal and the pulse width modulation signal generation method thereof, but it is not to limit the present invention, and the voltage regulator of the present invention can use multiple channel current sense signals instead, for example the use of dual-channel current sense signals as illustrated in FIG. 4.

Referring to FIG. 4, a schematic circuit structure of a voltage regulator in accordance with a second embodiment of the present invention is shown. As illustrated in FIG. 4, the voltage regulator 300 receives an input voltage VIN and controls switch transistors HS-MOS1, LS-MOS1, HS-MOS2, LS-MOS2 respectively according to pulse width modulation signals TON1, TOFF1, TON2, TOFF2 to produce inductor currents IL1, IL2 for charging an output capacitor C with an equivalent series resistance Resr to thereby obtain an output voltage VOUT for a load. In the illustrated embodiment, the voltage regulator 300 primarily includes comparators CMP1, CMP2, CMP3, D-type flip-flops DFF1, DFF2 and ramp signal generation circuits RAMP1, RAMP2, RAMP3.

In particular, the comparator CMP1 has a positive input terminal (+) and a negative input terminal (−). The positive input terminal (+) of the comparator CMP1 receives an output sense signal VEA and further is electrically coupled to the negative input terminal (−) of the comparator CMP1. The negative input terminal (−) of the comparator CMP1 receives a ramp signal D-RAMP provided from the ramp signal generation circuit RAMP1 and further is electrically coupled to a reference voltage V2V. Herein, the reference voltage V2V acts as an initial voltage level of the ramp signal D-RAMP. The comparator CMP1 compares the ramp signal D-RAMP with the output sense signal VEA to sequentially output ON-time trigger signals respectively for the pulse width modulation signals TON1, TON2 to thereby determine start points of ON-times of the respective pulse width modulation signals TON1, TON2. In the illustrated embodiment, the output sense signal VEA includes current sense signals VCS1, VCS2 and an output voltage error signal COMP mixed together in a preset ratio. The current sense signal VCS1 is generated by a voltage amplifier AMP1 according to voltage signals ISEN1, ISEN1_N respectively on two terminals of a current sense resistor Rs1, and thus the current sense signal VCS1 is varied along the inductor current IL1 flowing through an inductor L1, such as the absolute value of the current sense signal VCS1 is proportional to that of the inductor current IL1. Similarly, the current sense signal VCS2 is generated by another voltage amplifier AMP2 according to voltage signals ISEN2, ISEN2_N respectively on two terminals of another current sense resistor Rs2, and thus the current sense signal VCS2 is varied along the inductor current IL2 flowing through another inductor L2, such as the absolute value of the current sense signal VCS2 is proportional to that of the inductor current IL2. The output voltage error signal COMP is generated by an error amplifier EA according to a difference between a feedback value FB of the output voltage VOUT and a reference voltage Vref (e.g., a target voltage identification value), and thus the output voltage error signal COMP is varied along the difference between the feedback value FB and the reference voltage Vref. For example, each of the current sense signals VCS1, VCS2 is mixed with the output voltage error signal COMP in a ratio of 10:1, and such exemplary ratio can be determined by setting amplification factors of the respective voltage amplifiers AMP1, AMP2 and error amplifier EA, but it is not to limit the invention.

The D-type flip-flop DFF1 has a clock input terminal electrically coupled to an output terminal of the comparator CMP1 to receive the ON-time trigger signal for the pulse width modulation signal TON1, so that the D-type flip-flop DFF1 is subjected to the trigger of the ON-time trigger signal to output the pulse width modulation signal TON1 on an output terminal Q thereof and further output the pulse width modulation signal TOFF1 on another output terminal QB thereof. The D-type flip-flop DFF1 has a data input terminal D electrically coupled to receive a phase selection signal PHC for data input. Similarly, the D-type flip-flop DFF2 has a clock input terminal electrically coupled to the output terminal of the comparator CMP1 to receive the ON-time trigger signal for the pulse width modulation signal TON2, so that the D-type flip-flop DFF2 is subjected to the trigger of the ON-time trigger signal to output the pulse width modulation signal TON2 on an output terminal Q thereof and further output the pulse width modulation signal TOFF2 on another output terminal QB thereof. The D-type flip-flop DFF2 has a data input terminal D electrically coupled to receive another phase selection signal PHCB for data input. Herein, the phase selection signals PHC and PHCB are phase-inverted with each other. Moreover, the pulse width modulation signals TOFF1, TOFF2 respectively are phase-inverted with the pulse width modulation signals TON1, TON2, and further the pulse width modulation signals TOFF1, TOFF2 act as trigger signals for triggering the ramp signal D-RAMP provided from the ramp signal generation circuit RAMP1 to ramp down.

The comparator CMP2 has a positive input terminal (+) and a negative input terminal (−). The positive input terminal (+) of the comparator CMP2 receives the output sense signal VEA. The negative input terminal (−) of the comparator CMP2 receives a ramp signal U-RAMP1 provided from the ramp signal generation circuit RAMP2. An output terminal of the comparator CMP2 is electrically coupled to a reset terminal R of the D-type flip-flop DFF1. The comparator CMP2 compares the ramp signal U-RAMP1 with the output sense signal VEA to determine the moment of resetting the D-type flip-flop DFF1 to thereby determine an end point of the ON-time of the pulse width modulation signal TON1 and the moment of the ramp signal D-RAMP starting to ramp down. In the illustrated embodiment, the ramp signal generation circuit RAMP2 is subjected to the control of the pulse width modulation signals TON1, TOFF1 outputted from the D-type flip-flop DFF1, and primarily includes a power source ITON, a switch SW1, a capacitor C1 and a transistor M1. The power source ITON and the switch SW1 cooperatively constitute a charging circuit. The charging circuit is subjected to the control of the pulse width modulation signal TON1 to selectively charge the capacitor C1 for enabling the ramp signal U-RAMP1 to ramp up. The transistor M1 acts as a discharging circuit. The discharging circuit is subjected to the control of the pulse width modulation signal TOFF1 to selectively quickly discharge the capacitor C1 to a preset voltage level e.g., the grounding level GND for resetting the ramp signal U-RAMP1.

Similar to the comparator CMP2, the comparator CMP3 has a positive input terminal (+) and a negative input terminal (−). The positive input terminal (+) of the comparator CMP3 receives the output sense signal VEA. The negative input terminal (−) of the comparator CMP3 receives a ramp signal U-RAMP2 provided from the ramp signal generation circuit RAMP3. An output terminal of the comparator CMP3 is electrically coupled to a reset terminal R of the D-type flip-flop DFF2. The comparator CMP3 compares the ramp signal U-RAMP2 with the output sense signal VEA to determine the moment of resetting the D-type flip-flop DFF2 to thereby determine an end point of the ON-time of the pulse width modulation signal TON2 and another moment of the ramp signal D-RAMP starting to ramp down. In the illustrated embodiment, the ramp signal generation circuit RAMP3 is subjected to the control of the pulse width modulation signals TON2, TOFF2 outputted from the D-type flip-flop DFF2 and primarily includes a power source ITON, a switch SW2, a capacitor C2 and a transistor M2. The power source ITON and the switch SW2 cooperatively constitute a charging circuit. The charging circuit is subjected to the control of the pulse width modulation signal TON2 to selectively charge the capacitor C2 for enabling the ramp signal U-RAMP2 to ramp up. The transistor M2 acts as a discharging circuit. The discharging circuit is subjected to the control of the pulse width modulation signal TOFF2 to selectively quickly discharge the capacitor C2 to the preset voltage level e.g., the grounding level GND for resetting the ramp signal U-RAMP2.

Figure 5:
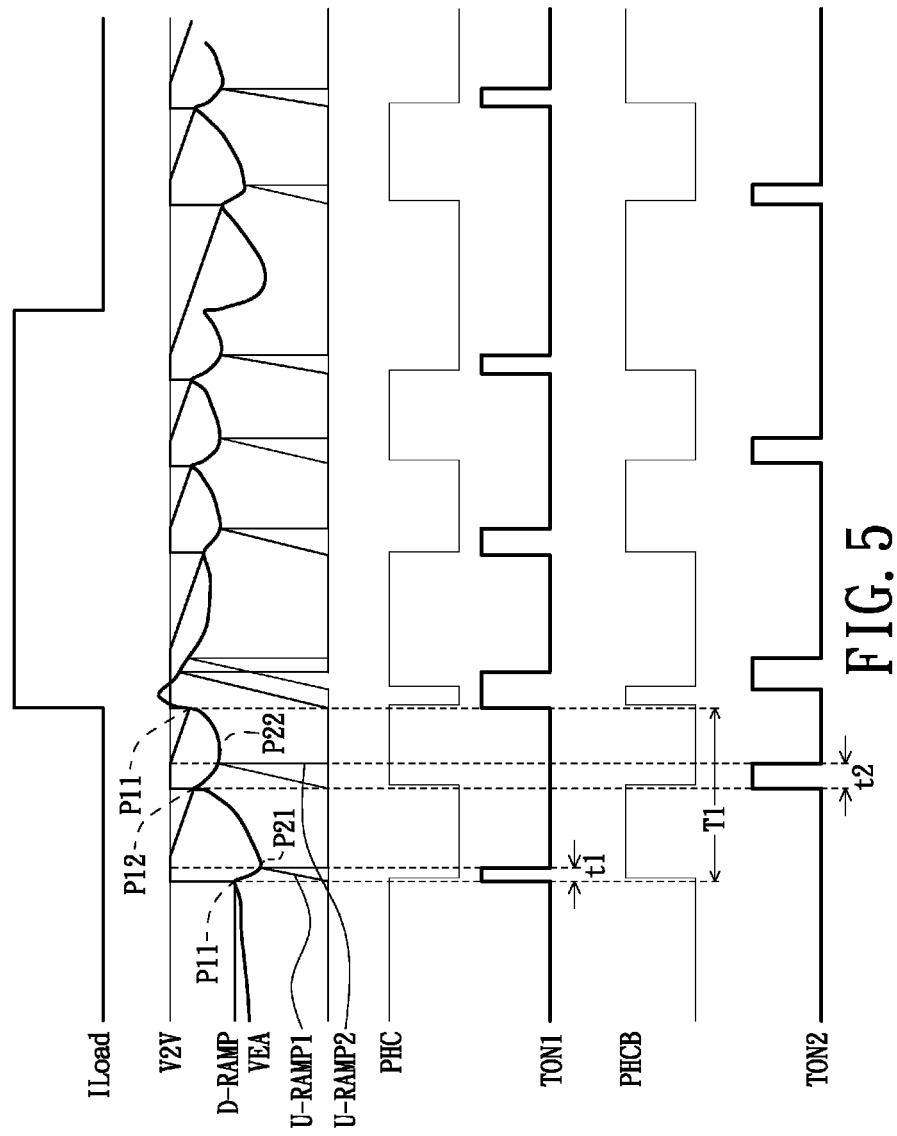
FIG. 5 is a timing diagram of multiple signals of the voltage regulator in FIG. 4.

Referring to FIG. 4 and FIG. 5 together, FIG. 5 shows a timing diagram associated with multiple signals such as a load current ILoad of the voltage regulator, the reference voltage V2V, the ramp signals D-RAMP, U-RAMP1, U-RAMP2, the output sense signal VEA, the phase selection signal PHC and the pulse width modulation signals TON1, TON2. As illustrated in FIG. 5, when the ramp signal D-RAMP is crossed with the output sense signal VEA to define a time point P11 acting as an ON-time trigger point for the pulse width modulation signal TON1, the ramp signal D-RAMP is reset to the reference voltage V2V at the time point P11 and then kept on the reference voltage V2V for a while, the output terminal Q of the D-type flip-flop DFF1 starts to output a high voltage level (i.e., the pulse width modulation signal is at a high voltage level), the output terminal Q of the D-type flip-flop DFF2 still outputs a low voltage level resulting from the phase selection signal PHCB on the data input terminal D of the D-type flip-flop DFF2 is a low voltage level, the switch SW1 in the ramp signal generation circuit RAMP2 is turned on to charge the capacitor C1 for enabling the ramp signal U-RAMP1 to ramp up. After that, when the ramp signal U-RAMP1 ramps up to be crossed with the output sense signal VEA to define a time point P21, the D-type flip-flop DFF1 is reset so that the pulse width modulation signal TON1 outputted from the output terminal Q of the D-type flip-flop DFF1 jumps to the low voltage level, while the phase-inverted pulse width modulation signal TOFF1 jumps to the high voltage level, the transistor M1 in the ramp signal generation circuit RAMP2 is enabled by the pulse width modulation signal TOFF1 to be turned on so that the capacitor C1 is fast discharged to the present voltage level e.g., grounding level GND for resetting the ramp signal U-RAMP1 to the present voltage level, the ramp signal generation circuit RAMP1 is subjected to the trigger of the pulse width modulation signal TOFF1 to enable the ramp signal D-RAMP provided therefrom to ramp down from the reference voltage V2V.

Subsequently, when the ramp signal D-RAMP ramps down from the reference voltage V2V to be crossed with the output sense signal VEA again to define a time point P12 acting as an ON-time trigger signal for the pulse width modulation signal TON2, the ramp signal D-RAMP is reset to the reference voltage V2V at the time point P12 and then kept on the reference voltage V2V for a while, the output terminal Q of the D-type flip-flop DFF2 starts to output the high voltage level (i.e., the pulse width modulation signal TON2 is at the high voltage level) resulting from the phase selection signal PHCB on the data input terminal D of the D-type flip-flop DFF2 is a high voltage level, the switch SW2 in the ramp signal generation circuit RAMP3 is turned on to charge the capacitor C2 for enabling the ramp signal U-RAMP2 to ramp up. After that, when the ramp signal U-RAMP2 ramps up to be crossed with the output sense signal VEA to define a time point P22, the D-type flip-flop DFF2 is reset so that the pulse width modulation signal TON2 outputted from the output terminal Q of the D-type flip-flop DFF2 jumps to the low voltage level, while the pulse width modulation signal TOFF2 jumps to the high voltage level. The transistor M2 in the ramp signal generation circuit RAMP3 is enabled by the pulse width modulation signal TOFF2 to be turned on, so that the capacitor C2 is fast discharged to the preset voltage level (e.g., the grounding level GND), and the ramp signal U-RAMP2 is reset to the preset voltage level consequently. It is also can be found from FIG. 5 that, the pulse width modulation signals TON1, TON2 are sequentially generated, and the time points P12, P22 for the ON-time t2 of the pulse width modulation signal TON2 falls in the switching period T1 (which is determined by adjacent two time points P11) of the pulse width modulation signal TON1 including the time points P11, P21.

In addition, it is indicated that, similar to the voltage regulator 100 in accordance with the first embodiment of the present invention, the voltage regulator 300 in accordance with the second embodiment of the present invention in various steady operation periods, the ON-times t1, t2 of the respective pulse width modulation signals TON1, TON2 are varied along the load conditions. In another aspect, in a load transient period, the voltage regulator 300 also can provide a suitable ON-times t1, t2 according to the change of output (including the change of the inductor currents) to regulate the corrected output voltage VOUT in real-time. In summary, the voltage regulator 300 of the present embodiment can provide a totally load situation-originated pulse width modulation control loop which can provide a dynamic ON-time for the pulse width modulation signal and thus will no longer be constrained by the synchronous signal and the switching frequency similar to the prior art.

Additionally, the current sense signals VCS and VCS1, VCS2 of the respective voltage regulators 100, 300 primarily are used to set a droop control signal of the output voltage or increase the stability of system, and thus they are not absolutely necessary, an operation principle of such voltage regulators 100, 300 without the use of the current sense signal(s) is similar to the above description and thus herein will not be repeated.

Sum up, in the various embodiments of the present invention, the output sense signal and the first ramp signal together are used to generate the switching trigger point (i.e., the start point of the ON-time) of the pulse width modulation signal, and further the output sense signal and the second ramp signal (or the third ramp signal) together are used to determine the end point of the ON-time and the trigger point for triggering the first ramp signal to ramp down, so that ON-time is dynamic. The first ramp signal is no longer constrained by the constant frequency synchronous clock like in the prior art, and therefore the ON-time of the pulse width modulation signal can provide a fast transient response to the change of the output sense signal caused by the load change. Moreover, owing to the present invention can provide dynamic ON-time control, which can solve the load transient regulation issue of the conventional COT system and further still can keep the advantages of COT system in steady state operation such as line regulation and compensation issue. Accordingly, the performance of the voltage regulator is effectively improved as a result.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A voltage regulator comprising:
   a first comparator, for comparing a first ramp signal with an output sense signal to output an ON-time trigger signal for a pulse width modulation signal, wherein the output sense signal comprises an output voltage error signal varied along with a difference between an output voltage of the voltage regulator and a first reference voltage;
   a flip-flop, for outputting the pulse width modulation signal and determining a start point of an ON-time of the pulse width modulation signal according to the triggering of the ON-time trigger signal; and a second comparator, for comparing a second ramp signal with the output sense signal to determine whether to reset an output of the flip-flop and thereby determining an end point of the ON-time of the pulse width modulation signal;

wherein a first input terminal of the first comparator is electrically coupled to receive the output sense signal and further electrically coupled to a second input terminal of the first comparator through a resistor, and the second input terminal of the first comparator is electrically coupled to receive the first ramp signal and further electrically coupled to a second reference voltage;

wherein the first ramp signal is reset to the second reference voltage at the start point of the ON-time of the pulse width modulation signal and then is maintained at the second reference voltage, and further ramps down starting from the end point of the ON-time of the pulse width modulation signal;

wherein the second ramp signal ramps up starting from the start point of the ON-time of the pulse width modulation signal, and then is reset at the end point of the ON-time of the pulse width modulation signal.

2. The voltage regulator according to claim 1, wherein the output sense signal further comprises a current sense signal varied along an inductor current of the voltage regulator, and the current sense signal is mixed with the output voltage error signal in a preset ratio.

3. The voltage regulator according to claim 2, further comprising:

a first amplifier, for outputting the output voltage error signal;

a second amplifier, for outputting the current sense signal so that the current sense signal is firstly mixed with the output voltage error signal in a preset ratio and then together inputted to a first input terminal of the first comparator; and a first ramp signal generation circuit, for outputting the first ramp signal to a second input terminal of the first comparator and being subjected to the control of a signal outputted from the flip-flop and phase-inverted with the pulse width modulation signal to enable the first ramp signal to ramp down.

4. The voltage regulator according to claim 1, further comprising:

a second ramp signal generation circuit, for outputting the second ramp signal to a second input terminal of the second comparator, a first input terminal of the second comparator being electrically coupled to receive the output sense signal;

wherein the second ramp signal generation circuit comprises a charging circuit, a discharging circuit and a capacitor, the charging circuit is subjected to the control of the pulse width modulation signal outputted from the flip-flop to perform a charge operation on the capacitor so as to enable the second ramp signal to ramp up, the discharging circuit is subjected to the control of a signal outputted from the flip-flop and phase-inverted with the pulse width modulation signal to perform a discharge operation on the capacitor so as to reset the second ramp signal.

5. The voltage regulator according to claim 1, wherein the flip-flop is a D-type flip-flop, a clock input terminal of the D-type flip-flop is electrically coupled to receive the ON-time trigger signal for the pulse width modulation signal, and a reset terminal of the D-type flip-flop is electrically coupled to an output terminal of the second comparator.

6. A voltage regulator comprising:

a first comparator, for comparing a first ramp signal with an output sense signal to output ON-time trigger signals in a preset order respectively for a plurality of pulse width modulation signals, wherein the output sense signal comprises a plurality of current sensor signals and an output voltage error signal mixed together in a preset ratio, each of the current sense signals is varied along a corresponding inductor current of the voltage regulator, and the output voltage error signal is varied along a difference between an output voltage of the voltage regulator and a first reference voltage;

a plurality of flip-flops, respectively receiving the ON-time trigger signals outputted from the first comparator for respectively outputting the pulse width modulation signals, wherein each of the flip-flops is electrically coupled to receive corresponding one of the ON-time trigger signals and determines a start point of an ON-time of a corresponding one of the pulse width modulation signals according to the received corresponding one of ON-time trigger signals cooperative with an input signal inputted to a data input terminal of the flip-flop; and a plurality of second comparators, each for comparing a second ramp signal with the output sense signal to determine whether to reset an output of a corresponding one of the flip-flops and thereby determining an end point of the ON-time of the pulse width modulation signal outputted from the corresponding flip-flop;

wherein the first ramp signal is reset to a second reference voltage at the start point of the ON-time of each of the pulse width modulation signals and then kept on the second reference voltage, and further ramps down starting from the end point of the ON-time of the pulse width modulation;

wherein each of the second ramp signals ramps up starting from the start point of the ON-time of the corresponding pulse width modulation signal, and then is reset at the end point of the ON-time of the corresponding pulse width modulation.

7. The voltage regulator according to claim 6, wherein a first input terminal of the first comparator is electrically coupled to receive the output sense signal and further electrically coupled to a second input terminal of the first comparator through a resistor, the second input terminal of the first comparator is electrically coupled to receive the first ramp signal and further electrically coupled to the second reference voltage.

8. The voltage regulator according to claim 6, further comprising:

a first amplifier, for outputting the output voltage error signal;

a plurality of second amplifiers, respectively for outputting the current sense signals so that the current sense signals firstly are mixed with the output voltage error signal in a preset ratio and then together inputted to a first input terminal of the first comparator; and a first ramp signal generation circuit, for outputting the first ramp signal to a second input terminal of the first comparator and being subjected to the control of a signal outputted from each of the flip-flops and phase-inverted with the pulse width modulation outputted from the flip-flop to enable the first ramp signal to ramp down.

9. The voltage regulator according to claim 6, further comprising:

a plurality of second ramp signal generation circuits, each for outputting a corresponding one of the second ramp signals to a second input terminal of a corresponding one of the second comparators, a first input terminal of the corresponding second comparator being electrically coupled to receive the output sense signal;

wherein each of the second ramp signal generation circuits comprises a charging circuit, a discharging circuit and a capacitor, the charging circuit is subjected to the control of the pulse width modulation signal outputted from the corresponding flip-flop to perform a charge operation on the capacitor so as to enable the corresponding second ramp signal to ramp up, the discharging circuit is subjected to the control of a signal outputted from the corresponding flip-flop and phase-inverted with the pulse width modulation signal outputted from the corresponding flip-flop to perform a discharge operation on the capacitor so as to reset the corresponding second ramp signal.

10. The voltage regulator according to claim 6, wherein each of the flip-flops is a D-type flip-flop, a clock input terminal of the D-type flip-flop is electrically coupled to receive the ON-time trigger signal for a corresponding one of the pulse width modulation signals, a reset terminal of the D-type flip-flop is electrically coupled to an output terminal of the corresponding second comparator, and a data input terminal of the D-type flip-flop is electrically coupled to a phase selection signal.

11. A pulse width modulation signal generation method adapted to the voltage regulator according to one of claims 1 and 6, and the method comprising:
    providing an output sense signal, wherein the output sense signal comprises an output voltage error signal varied along with a difference between an output voltage of the voltage regulator and a first reference voltage;
    providing a first ramp signal and using a first time point of the first ramp signal crossing with the output sense signal to determine a start point of an ON-time of a pulse width modulation signal; and
    providing a second ramp signal and using a second time point of the second ramp signal crossing with the output sense signal to determine an end point of the ON-time of the pulse width modulation signal;
    wherein the first ramp signal is reset to a second reference voltage at the first time point and then maintained at the second reference voltage, and further ramps down starting from the end point of the ON-time of the pulse width modulation signal;
    wherein the second ramp signal ramps up starting from the start point of the ON-time of the pulse width modulation signal, and further is reset to a preset voltage at the second time point.

12. The pulse width modulation signal generation method according to claim 11, further comprising:
    enabling a value of the ON-time of the pulse width modulation signal during the voltage regulator operates at a heavy load steady state to be larger than another value of the ON-time of the pulse width modulation signal during the voltage regulator operates at a light load steady state.

13. The pulse width modulation signal generation method according to claim 11, wherein the output sense signal further comprises at least one current sense signal, each of the at least one current sense signal is varied along with an inductor current of the voltage regulator, the at least one current sense signal and the output voltage error signal are mixed together in a preset ratio.

14. The pulse width modulation signal generation method according to claim 13, wherein when the amount of the at least one current sense signal is multiple, the pulse width modulation signal generation method further comprises:
    providing a third ramp signal, using a third time point of the first ramp signal crossing with the output sense signal to determine a start point of an ON-time of a second pulse width modulation signal, and using a fourth time point of the third ramp signal crossing with the output sense signal to determine an end point of the ON-time of the second pulse width modulation signal;
    wherein the third time point and the fourth time point fall in a switching period of the first pulse width modulation signal including both the first time point and the second time point.

15. The voltage regulator according to claim 3, wherein the current sense signal is generated by the second amplifier according to two voltage signals respectively on two terminals of a current sense resistor, and the inductor current flows through an inductor of the voltage regulator.

16. The voltage regulator according to claim 2, wherein an absolute value of the current sense signal is proportional to that of the inductor current.

17. The voltage regulator according to claim 3, wherein the preset ratio is preset by setting amplification factors of the first amplifier and the second amplifier.

18. The voltage regulator according to claim 17, wherein the preset ratio is 10:1.

19. The voltage regulator according to claim 8, wherein each of the current sense signals is generated by one corresponding second amplifier according to two voltage signals respectively on two terminals of a corresponding current sense resistor.

20. The voltage regulator according to claim 6, wherein each of the current sense signals is mixed with the output voltage error signal in a ratio of 10:1.

* * * * *